US008869112B2

(12) United States Patent
Kemmler et al.

(10) Patent No.: US 8,869,112 B2
(45) Date of Patent: Oct. 21, 2014

(54) SYSTEM AND METHOD FOR MODULAR BUSINESS APPLICATIONS

(75) Inventors: Andreas Kemmler, Bönnigheim (DE); Torsten Kamenz, Wiesloch (DE)

(73) Assignee: SAP SE, Walldorf (DE)

( * ) Notice: Subject to any disclaimer, the term of this patent is extended or adjusted under 35 U.S.C. 154(b) by 996 days.

(21) Appl. No.: 12/956,481

(22) Filed: Nov. 30, 2010

(65) Prior Publication Data

US 2012/0137272 A1    May 31, 2012

(51) Int. Cl.
  *G06F 9/44*    (2006.01)
  *G06F 9/445*   (2006.01)
  *G06F 11/36*   (2006.01)

(52) U.S. Cl.
  CPC ............ *G06F 8/65* (2013.01); *G06F 11/368* (2013.01)
  USPC .......................... 717/124; 717/168

(58) Field of Classification Search
  None
  See application file for complete search history.

(56) References Cited

U.S. PATENT DOCUMENTS

| | | | | |
|---|---|---|---|---|
| 5,911,060 A * | 6/1999 | Elliott | ............................ | 718/100 |
| 5,966,541 A * | 10/1999 | Agarwal | ....................... | 717/132 |
| 6,009,258 A * | 12/1999 | Elliott | .............................. | 703/22 |
| 6,151,569 A * | 11/2000 | Elliott | .............................. | 703/22 |
| 6,769,114 B2 * | 7/2004 | Leung | ........................... | 717/124 |
| 6,948,153 B2 * | 9/2005 | Bowers | .......................... | 717/124 |
| 6,966,013 B2 * | 11/2005 | Blum et al. | ................... | 714/38.1 |
| 6,981,245 B1 | 12/2005 | Schwabe | | |
| 7,401,331 B2 * | 7/2008 | Leung | ............................ | 717/168 |
| 8,079,018 B2 * | 12/2011 | Huene et al. | ................... | 717/124 |
| 8,201,148 B2 * | 6/2012 | Solirov et al. | .................. | 717/122 |
| 8,375,364 B2 | 2/2013 | Udupa et al. | | |
| 8,429,395 B2 * | 4/2013 | Russell et al. | ................. | 713/100 |
| 8,495,619 B2 * | 7/2013 | Tammana | ...................... | 717/174 |
| 2002/0066077 A1 * | 5/2002 | Leung | ............................ | 717/126 |
| 2006/0122962 A1 | 6/2006 | Ushiku | | |
| 2006/0277539 A1 | 12/2006 | Amarasinghe et al. | | |
| 2008/0172660 A1 | 7/2008 | Arning et al. | | |
| 2010/0115401 A1 | 5/2010 | Nordine et al. | | |

(Continued)

FOREIGN PATENT DOCUMENTS

EP     2 241 977 A1    10/2010
WO     2006/111000 A1  10/2006

OTHER PUBLICATIONS

European Search Report for EP 11 19 3810.6, dated Jul. 24, 2012.
Faure, D. et al., "KDE Kontact: An Application Integration Framework PIM Components Get Together", Proceedings of the Usenix Annual Technical Conference, Jan. 1, 2004, pp. 115-126, XP002363478.

(Continued)

*Primary Examiner* — Lewis A Bullock, Jr.
*Assistant Examiner* — Jacob Dascomb
(74) *Attorney, Agent, or Firm* — Kenyon & Kenyon LLP

(57) ABSTRACT

A tailored add-on component for a released software product having internal and released development objects. The released development objects are designed for external use, such as end-user customization. The internal development objects are designed for use within the released software product, with no access from outside components. The tailored add-on component adds a functional application that makes calls to both released and internal objects. Access to internal objects is made while maintaining stability by confining internal object calls to a single adaptation component within the add-on, while also implementing an interface for the objects of the software product that are used by the add-on. The interface includes a function to freeze objects that are in the interface, and a set of automatic test components to identify changes in the objects that are in the interface.

15 Claims, 3 Drawing Sheets

(56) References Cited

U.S. PATENT DOCUMENTS

2010/0131084 A1   5/2010  Van Camp
2010/0153782 A1   6/2010  Chandra
2010/0293541 A1  11/2010  Pall et al.
2011/0296377 A1  12/2011  Morozov et al.
2012/0272212 A1  10/2012  Lu et al.

OTHER PUBLICATIONS http://help.sap.com/erp2005_ehp_04/helpdata/EN/8f/f2e540f8648431e10000000a1550b0/frameset.htm site accessed on Dec. 3, 2010.

European Communication, dated Jun. 17, 2013, from EP Patent Application No. 11 007 332.7.

* cited by examiner

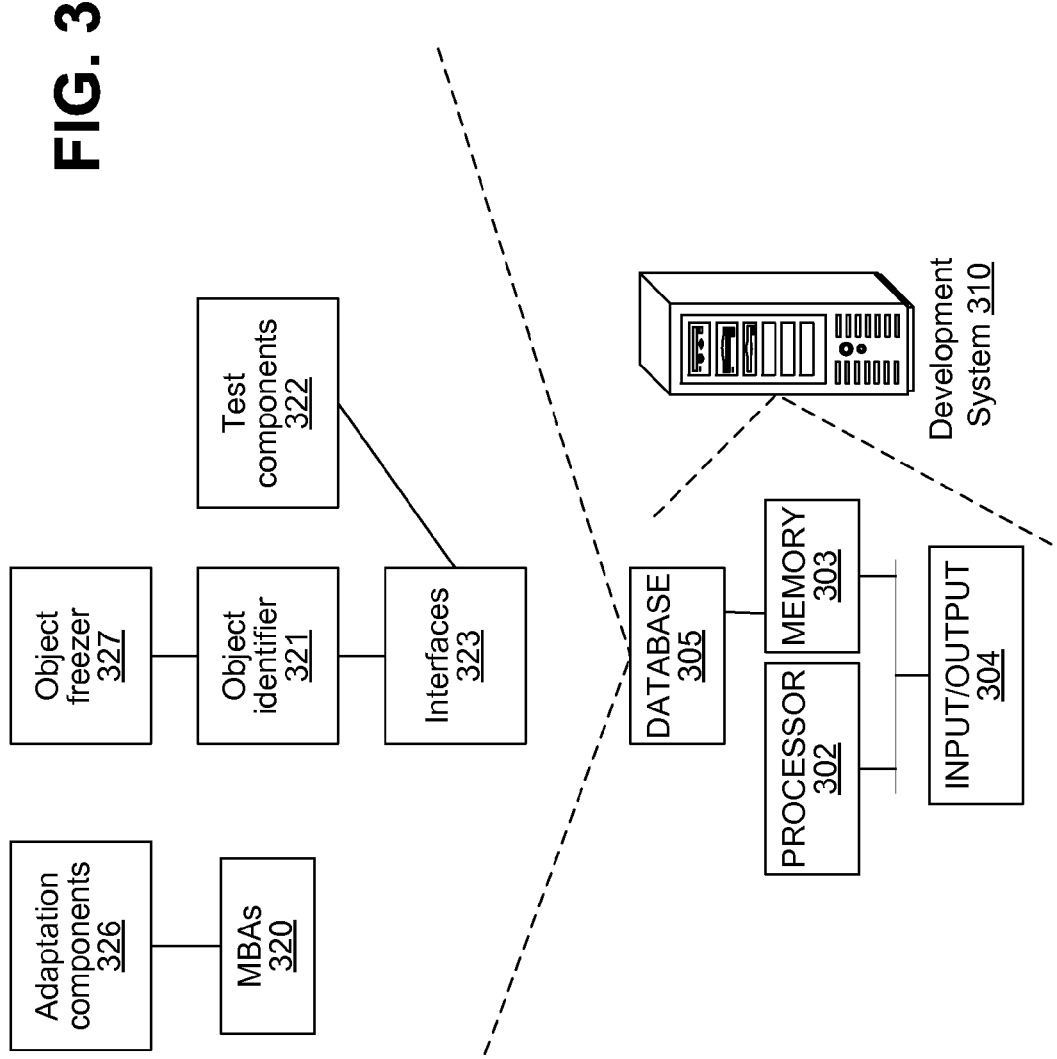

SYSTEM AND METHOD FOR MODULAR BUSINESS APPLICATIONS

BACKGROUND

Business entities require business software for performing an array of essential tasks, such as communication, planning, inventory control, order processing, systems monitoring, and nearly every facet of a business' operations. A business entity often requires a software solution with features, interfaces, data management, and other aspects unique to that one specific company. Yet, core functions may be similar among the different unique solutions. These core functions may be provided to several, unique business entities, e.g., companies. In addition to needing to vary several initial deployments among a variety of customer-companies, these varied implementations may need constant updating, to evolve with the evolving business' needs.

Software developers may design and provide a set of software tools in a generic or universal form. These tools may be controlled by a set of customization data that is specific to each unique customer. Unlike the companies' transactional data, which may include millions of data records or more, the configuration and customization data may represent a very small and rarely changing set of data. This data may modify, instantiate, activate, or otherwise implement the provided tools, in a customer specific manner. With the configuration data, customers may be able to modify every aspect of their software experience, including defining the user interfaces, what functions are available on the interfaces, and/or what fields are provided to the user.

To help maintain these software packages, SAP® AG (a developer) introduced an enhancement package strategy as a means to simplify the way customers manage and deploy new software functionality. Customers may selectively implement these software innovations from a developer and activate the software upon business demand. As a result, customers can isolate the impact of software updates from introducing/rolling out new functionality and bring new functionality online faster through shortened testing cycles. Customers no longer have to plan for major releases every few years. They may now choose to selectively implement the business functions or technical improvements that add the value that matters most to their business. A developer may use enhancement packages to quickly and easily deliver business and industry-specific functionality, enterprise services, and other functions that help improve and simplify the use of software through user interface and other end-to-end process improvements.

These enhancement packages may be cumulative from a functional perspective, e.g., current enhancement packages may contain the entire content of earlier packages. So each enhancement package may be based on the previous one. Enhancement packages may also have the same maintenance duration as the underlying core application. Each enhancement package may contain new versions of existing software components. With the enhancement packages customers can choose which software components are updated in their systems, depending on the new/extended functionality they want to use. This may mean that over time the enhancement packages may become bigger and bigger and in the meantime may not be much smaller than a full standard release. At least for customers who do not install the enhancement packages regularly, the intended flexibility and the ease of installation may no longer be given in their full extent.

Example embodiments of the present invention further encourage customer adoption of the enhancement package model and provides unique niche enhancement packages by providing a highly integrated Modular Business Application ("MBA"). Modular Business Applications may be delivered as an add-on for software versions that are already released and delivered to customers. Such released product versions might not be easily extended, since an add-on may have to properly work with the interfaces available in the released versions. Typically, these released versions have a certain set of interfaces that may be used by customers to provide extensions. However, to build whole applications on top of a released version, these interfaces may not be complete enough from a functional point of view. For Modular Business Applications (which should be highly integrated to the underlying product) this means that internal functions/internal development objects of the underlying product that are not part of the official interface—have to be used to get a tight (i.e. highly tailored) integration.

However, calling internal functions may contain a high risk. Since the owners of internal functions are generally not aware of external usages (e.g., by Modular Business Applications) they consider only the internal usages when they change, extend, or correct their functions. From a MBA point of view these internal functions are unstable as they might be changed in an unpredictable way. These changes might be incompatible for Modular Business Applications and could lead to broken business processes or even inconsistent data in the Modular Business Application.

Thus there is a need to build add-ons on already shipped releases without modifying them and without restricting the MBA development on using only released interfaces. Development of Modular Business Applications should be able to use internal (e.g., private) elements from the released products. This may be needed to build highly integrated and function rich applications. But it should be ensured that using these internal development objects does not have side effects in lifecycle management events like installing service packs, installing other add-ons, applying corrections, or doing a version upgrade. Example embodiments of the present invention provide the highly integrated Modular Business Application ("MBA") to address these issues.

BRIEF DESCRIPTION OF THE DRAWINGS

FIG. 3 illustrates one example system, according to an example embodiment of the present invention.

DETAILED DESCRIPTION

Figure 1:
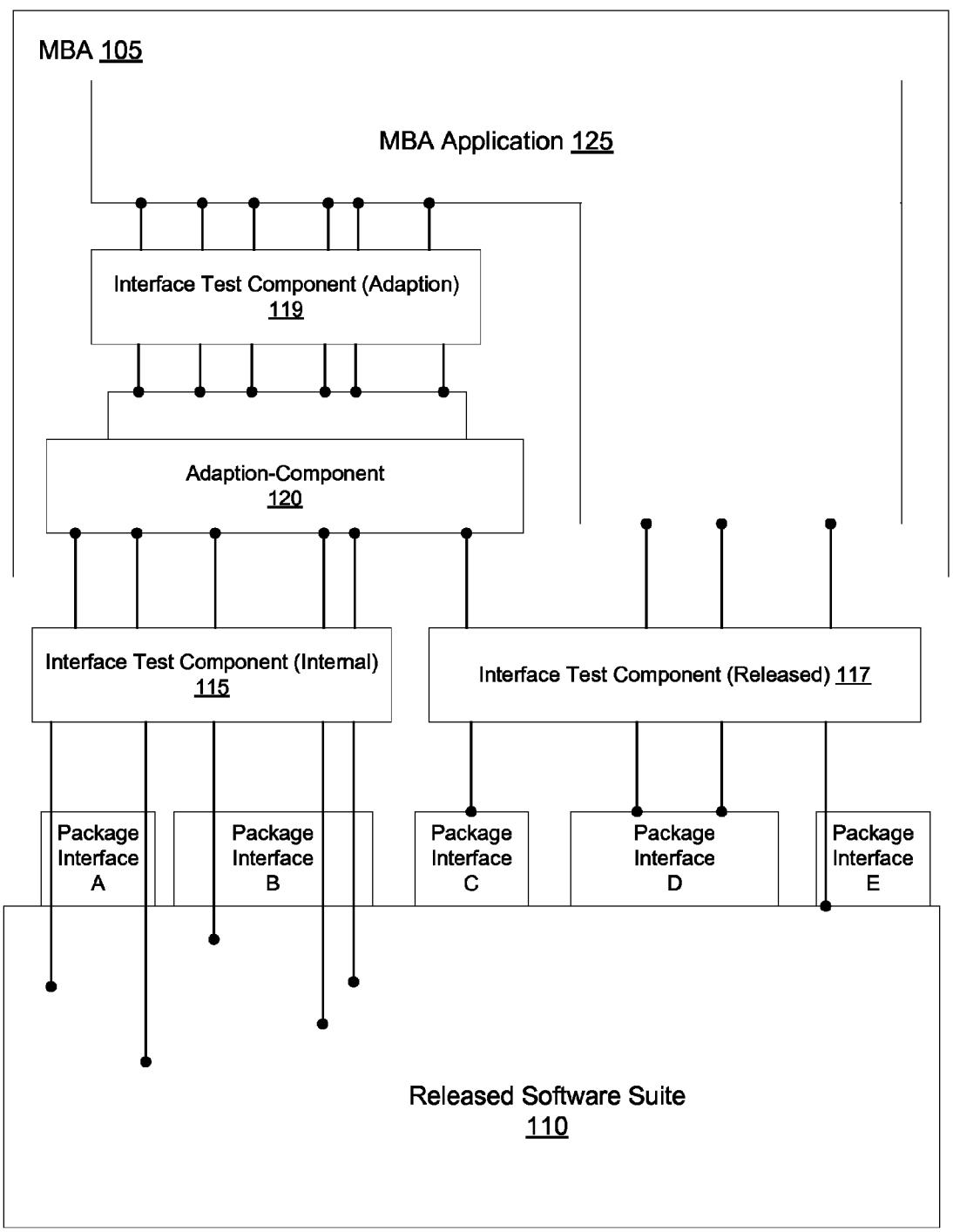
FIG. 1 illustrates one example layout of various component parts of an example embodiment of the present invention.

Example embodiments of the present invention may introduce two new architectural elements, the ERP-Adaptation-Component and the ERP-MBA-Interface, and some supporting measures, e.g., an Interface Freeze and the introduction of Automatic Test Components. ERP stands for Enterprise Resource Planning from SAP® AG, but is only one example of a released software package for which example embodiments of the present invention may provide MBAs. Used herein, ERP provides an illustrative example, but the example embodiments of the present invention may be applied to any other multi-function software package. Example embodiments of the present invention provide highly tailored add-on applications that have access to functions (e.g., within the ERP) that normally are reserved for internal use only. The elements of the example embodiments may identify and register any used and/or potentially unstable ERP parts, to direct and structure their usage in the MBA and to obtain as much control over them as possible, in an effort to keep them stable.

A first aspect of example embodiments of the present invention may be referred to as an adaptation component or ERP-Adaptation-Component as just one example. The Modular Business Applications may require the use of internal development objects from the ERP. The interfaces of such objects may not be guaranteed stable, as such objects might not have been designed for direct interaction and/or customization by customers/users. This may be the usual behavior for internal and private objects. To call such objects therefore contains risk. This risk might not be avoided completely, but it should be brought under control, so that the potential effects are minimized as much as possible.

This may be done, in part, by introducing an ERP-Adaptation-Component which may comprise part of a Modular Business Application. All calls or usage of internal ERP development objects/functions may be done exclusively through this component. This means it may contain an encapsulation of each of the internal ERP objects needed by the Modular Business Application. In one example embodiment this encapsulation may just delegate the call to the encapsulated object, which means the interface of the encapsulation and the encapsulated object are equivalents. In other example embodiments the encapsulation may be used to implement a composition of internal ERP development objects. This means instead of just delegating the call, a specific sequence of ERP internal objects are called and the individual results may be put together in a way needed by the Modular Business Application. A third example embodiment for the encapsulation is to offer a certain simplification of the encapsulated ERP interface. This may mean the encapsulation offers only a subset of the interface parameters of the encapsulated object. Finally, another example embodiment may include some combination of these or other alternatives.

The Modular Business Application may be restricted from calling any internal ERP objects directly, and access may be limited to the encapsulations. This example embodiment provides several benefits. First all package errors may be concentrated in one place. Calling internal objects may result in package errors, as internal objects are usually not offered to others via a published package interface. Having access to internal ERP objects bundled in the ERP-Adaptation-Component may therefore cause package conflicts. However, these conflicts may only occur in the ERP-Adaptation Component and not in the other parts of the Modular Business Application. This means the major parts of the application can use the package concept to ensure decoupling, as these parts are not disrupted with unavoidable package error.

Confinement to the encapsulation may also restrict the effects of incompatible changes to one place. This means that errors due to changes of internal ERP objects may occur only in the ERP-Adaptation-Component, and not within the rest of the Modular Business Applications. It may therefore be much easier to detect collisions/conflicts, since they are not distributed through the whole Modular Business Application. Additionally, automatic tests to ensure the stability of the underlying ERP version may only be needed for the ERP-Adaptation-Component, since the rest of the Modular Business Applications is not calling anything unstable directly from the ERP.

There may be a single place where a certain object from the core is used, in the ERP-Adaptation-Component. If the core object is changed, only one place has to be adapted, as opposed to several areas distributed through the whole Modular Business Application. This may make the 'interface' (e.g., the number of core object usages) as small as possible. It may therefore be easier to 'control' the interface. Further, the encapsulation may offer the possibility to deploy the Modular Business Applications and the ERP-Adaptation-Component independently and therefore on different systems. Modular Business Applications could, for example, be deployed on a separate system whereas the ERP-Adaptation-Component could be deployed as an add-on in the ERP system. The ERP-Adaptation-Component could then act as an integration component, as technical enabler to access the ERP system. This may force the ERP-Adaptation-component to offer the encapsulations in a way that they can be called remotely.

Add-ons that call internal objects of the underlying product may be forced to offer a specific add-on version for each version of the underlying product. Since there are many different product versions of ERP in the market (each enhancement package may be a different product version from a purely technical point of view) a MBA based on ERP might have to offer many different versions. This could be partly prevented by just offering different versions of the ERP-Adaptation-Component. Each version of the ERP-Adaptation-Component may then adapt the specifics of the corresponding ERP version and keep the interface towards the application part of the MBA stable. This may mean only one version of the application part of the MBA is needed, which may reduce the development and maintenance costs.

A second aspect of example embodiments of the present invention may be referred to as an add-on interface, e.g., ERP-MBA-Interface. The ERP-MBA-Interface may include a collection of package interfaces of structure packages, which may contain objects that are allowed to be used by the Modular Business Applications. These objects may be internal objects (e.g., private objects) as well as released objects (e.g., public objects). The ERP-MBA-Interface may contain all of the objects used by the Modular Business Application. The Modular Business Applications (including the ERP-Adaptation-Component) may be configured to only use objects which are part of the ERP-MBA-Interface, and may help ensure that no other package interface is used (e.g., with an appropriate naming convention).

The ERP-MBA-Interface may include a set of interfaces that may be created in the corresponding ERP Support Packages and delivered to customers from there. There is no risk in delivering such interfaces in a Support Package if they contain no functional changes but only interface definitions. These package interfaces may specify the objects which are part of the ERP-MBA-Interface. Having these objects specified offers possibilities to ensure their stability, as described below.

An object freeze may be used in order to keep the objects in the ERP-MBA-Interface stable, thereby minimizing conflicts in the ERP-Adaptation-Component. This may address the problem that developers cannot easily see when a certain object is used by Modular Business Applications. The developers therefore may not know about the risks when changing or correcting an object. Example embodiments of the present invention may use an existing objects freeze engine to keep the objects stable and to warn developers about the external usage of their objects. The object freeze engine can be used to "freeze" certain development objects so that they will not be changed in an incompatible way. The objects freeze engine should be configured to recognize the package interfaces that are part of the ERP-MBA-Interface. This may be done based on a prescribed naming convention. For example, all package interfaces ending with _DEFAULT_FOR_MBA may be taken into account. The objects belonging to these interfaces may be automatically frozen. Frozen objects may not be changed that easily, and a developer may at least get a warning when these objects are altered in the corresponding development environment. There may be an additional message added, which tells the developer that he/she is using a frozen object that belongs to the ERP-MBA-Interface. Additionally, a frozen object may require permission to alter (e.g., from the MBA developer, or a design project supervisor).

There may also be a background job to check for new relevant package interfaces, and there may be the possibility to start the freeze process both manually or automatically for a certain set of package interfaces. The background job may be scheduled on a regular basis and may check for new interfaces that form part of an MBA, e.g., those ending with a predetermined label, e.g., '_DEFAULT_FOR_MBA'. The background process may also check whether an existing interface was enhanced by new objects. Changes to a frozen object may not be completely forbidden as corrections may be required, but some added obstacle may be implemented, e.g., as discussed above. Also, not every change is an incompatible one, and some incompatible changes do not necessarily have negative effects for the Modular Business Application. Therefore, example embodiment may also include a release specific interface test component to ensure that all the objects belonging to the ERP-MBA-Interface behave as before the correction from a MBA point of view. This test component may contain automatic tests for all objects of the ERP-MBA-Interface. The test component may also contain automations to create test data and programs to ensure that the expected system configurations are available. The automatic tests are then automatically executed and may, for example, just call certain functions and check whether the result of the call is as expected.

In addition to automatic tests for single functions there may also be the possibility to test whole applications. In this case the automatic test processes the user interfaces in a similar manner as a common user would do it, but in an automated manner. To check whether the test has been successful, the automatic test might access the corresponding database table directly, to see whether the expected application data has been stored in that table or not.

The test component may be built based on the same preconditions as the corresponding Modular Business Applications (e.g., with respect to the software package stack of underlying components). The test component may be restricted from public access, and may be available only internally. The test component may be configured as a separate software component, which offers high deployment and testing flexibilities. It is possible to install this automatic test component directly in the ERP maintenance system. This would allow for checking the compatibility and stability after each ERP correction and before an ERP SP is released. Finding incompatible changes that in the process could save costs, since the responsible developer could just adopt the causing correction in a way that it is still compatible to the Modular Business Applications. Alternatively, it is also possible to install the release specific interface test component in the Modular Business Applications development system and use it as an output qualification check, ensuring also that the delivered changes are stable regarding their users in the Modular Business Applications. As a third option it may be possible to install it on a central consolidation system, and integrate the contained tests into central quality assurance and measurement tools.

The automatic tests may cover at least the internal ERP objects of the ERP-MBA-Interface. The released ERP objects of ERP-MBA-Interface may also be covered, but these may be optional since they may already be made stable as objects expected to be accessed from outside (e.g., public/released objects). Alternatively or additionally, the automatic test for internal and released objects may be implemented as separate test components.

In addition to the ERP-MBA-Interface, the ERP-Adaptation-Component may be required to be kept stable in the Modular Business Applications (e.g., in the application part of the MBA). The ERP-MBA-Interface may contain automatic test cases for all objects that are allowed to be used by the Modular Business Applications. It could also be optionally installed and run in both the Modular Business Applications development system and the Modular Business Applications quality assurance system.

FIG. 1 illustrates one example embodiment of the present invention, where each of the above described aspects connect to perform example methods, according to other example embodiments of the present invention. The ERP-MBA-Interface is a collection of specific package interfaces, e.g., package interface A to E of FIG. 1, and includes package interfaces publicly released for use by MBAs. These interfaces may contain the objects or may provide an interface with the objects that belong to the underlying software, such as ERP and/or released software suite 110, and that need to be used by Modular Business Applications development.

Interfaces may be delivered in a variety of ways. Common package interfaces containing released (e.g., public) objects may be included in an initial shipment. Package interfaces containing released objects may be included in a support package, subsequently delivered. Also, package interfaces containing internal (e.g., not designed for external use) objects may be delivered by the same or different support packages. Thus, the interfaces may be created in support package updates, and initially may be delivered as an update or correction. Eventually, the interfaces may be part of the Modular Business Application development system landscape. The package interfaces may resolve package errors for the system, since only the usage of objects which are part of a package interface may be allowed. The ERP-MBA-Interface may also be responsible for identifying which objects have to be kept stable even in maintenance mode. To achieve this stability, all the objects belonging to the ERP-MBA-Interface may be "frozen" in their maintenance system. There may also be automatic monitoring to ensure that changes to the ERP-MBA-Interface will be detected automatically, which may lead to additional freezes of the affected development objects. This may put constraints on future changes to a frozen object. In one example embodiment, object developers will get a warning that they are changing an object belonging to the ERP-MBA-Interface. They may also get some instructions about what this means and how they should proceed.

In some example embodiments, the frozen objects will not be completely unchangeable, as corrections may be needed in the object. In addition to warnings for the developer, example embodiments may also include automatic test mechanisms, e.g., 115, 117, and 119. These test components may contain automatic tests for all objects of the ERP-MBA-Interface. The tests may be executed at different points in the development process, for example after a correction has been done, and/or upon user designation. Interface test component 117 may be included, and may automatically run tests on the released part of the ERP-MBA-Interface. This test component might be withheld from customer release, and act only in the development and maintenance systems of the software provider. An interface test component 115 may be included, and may automatically run tests on the internal (e.g., the non-public objects) part of the ERP-MBA-Interface. This test component might also be withheld from customer release, and act only in the development and maintenance systems of the software provider. An interface test component 119 may be included, and may automatically run test on the released objects of the ERP-Adaption-Component 120. The release specific adaption interface test component 119 may contain automatic tests for all objects of the ERP-Adaptation-Component 120 that are free to be used by the application part 125 of the Modular Business Application 105. It may therefore be ensured that the ERP-Adaptation-Component 120 is not incompatibly changed.

The Modular Business Application itself, e.g., MBA 105, may be split in at least two parts, one part may contain the application (e.g., 125) and another part may consist of the ERP-Adaptation-Component (e.g., 120). In one example embodiment, all accesses to internal objects in the interfaces A and B will be done in the adaption-component 120. The application part 125 of Modular Business Applications may not call any of these objects directly. The ERP-Adaptation-Component is a centralization, encapsulation, composition, and simplification component for ERP-MBA-Interface calls. As illustrated, the MBA application 125 may directly call released objects that are part of an available package interface, e.g., as represented by the lines to package interface D. The MBA application 125 may directly call released objects that are not part of a package interface, e.g., as represented by the line over package interface E, connected to software 110. Package E may not exist at the time this call is made to the software, and is later included in a support package. When called objects are part of a package interface the call is supported and may not result in a 'packaging error.' This means package interfaces are used to determine which objects are available to other packages and which are kept 'internal.' Objects which are part of a package interface are therefore made 'public' and it is ensured that they are kept stable. Thus, once package E is released, the associated objects may be supported as public, i.e. available for user customization.

The ERP-Adaptation-Component 120 may call package interfaces, e.g., as represented with package interface C. Additionally, the ERP-Adaptation-Component may call internal objects, and may be configured as the only way to call the internal objects. This may allow the MBA to build a highly tailored application extension on top of the released software suite, by giving the MBA the ability to call both released and unreleased (i.e. internal) objects. Eventually, these internal objects may themselves be released, and may be given an associated package interface, e.g., package interfaces A and B, in future support package updates.

Figure 2:
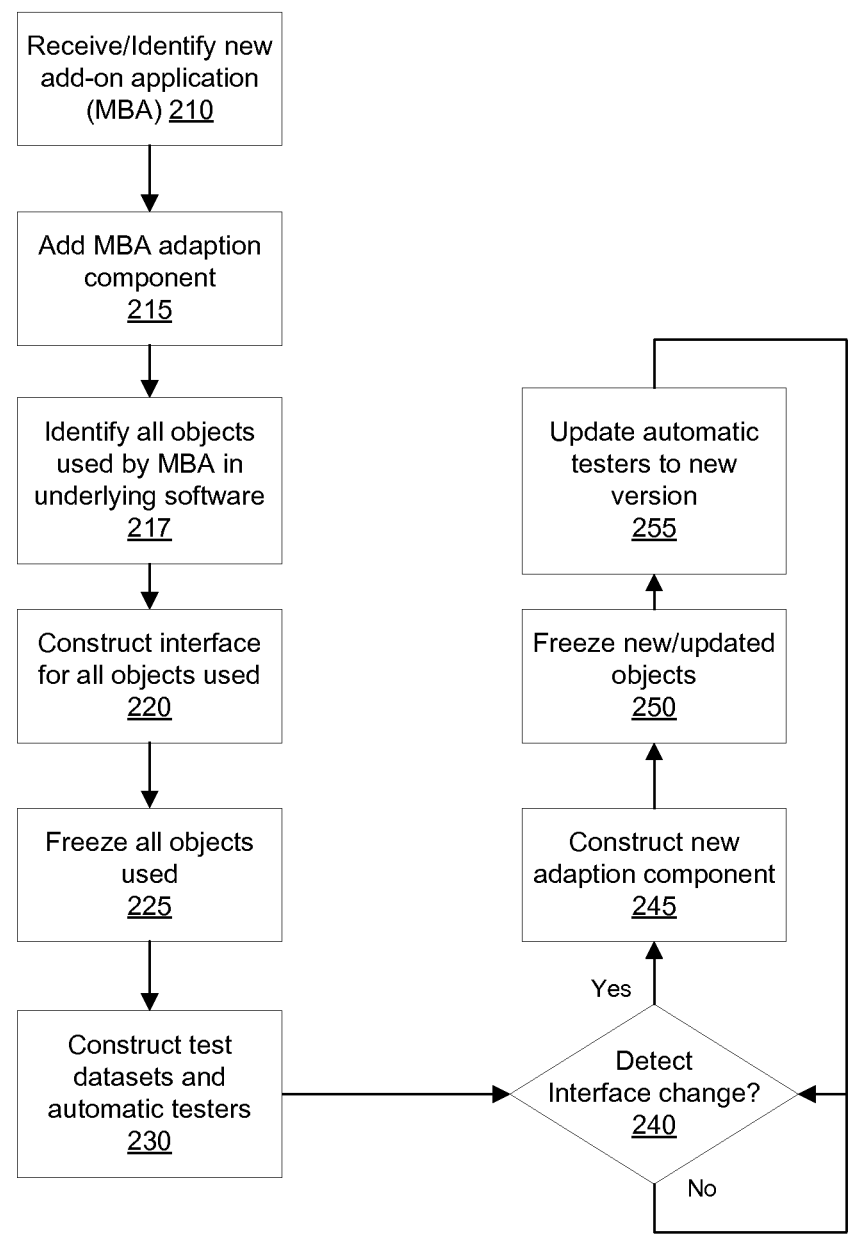
FIG. 2 illustrates one example method, according to an example embodiment of the present invention.

FIG. 2 illustrates one example method according to one example embodiment of the present invention. At 210, the example method may identify, begin, receive, or otherwise start an initial process for a new add-on application, e.g., an MBA. At 215, the example method may add the adaptation component that may serve as the MBA's access to internal objects of the underlying software (e.g., ERP). Next, at 217, the example method may identify all of the objects in the underlying software that the MBA uses. At 220, the example method may construct an interface for all of these identified objects. At 225, the example method may then freeze all of the objects in the interface, so that no changes can be made, without at least some warning to the developer that an MBA depends on that object. At 230, the example method may construct test datasets and automatic testers configured to identify when an interface has changed. This may include objects of the interface changing in a conflicting manner, objects being added to the interface, or any other development that could threaten the stability of the MBA's access to the underlying objects. The test components then monitor to detect an interface change at 240. If not change is detected, the example method may simply continue to monitor. Alternatively, as discussed above, example embodiments may run periodic test routines to detect the change, or run them upon manual indication (e.g., from the developer).

Once a change is detected, the example method may construct a new adaptation component for the MBA. In reality, this may be an indication to the MBA design team that a new adaptation component is required. In one example embodiment, before creating a new version of the adaptation component, developers may try to do the change in a way that it will not cause a conflict with the MBA. This may mean the change is done in compatible way, which may be the case for the majority of changes. However, in the case that this is not possible, a new version of the adaptation component may indeed be needed. Regardless, the application portion of the MBA can remain unchanged, since the adaptation component is the sole interface to the internal objects of the underlying software, it may be that only the adaptation component needs to be version specific. At 250, any new or updated objects are frozen or refrozen. Finally, at 255, the automatic testers are updated to reflect the new interface and adaption component, so that future changes as compared to these newer versions may be detected. The example method may then continue to monitor for interface changes to the new version of the interface.

FIG. 3 illustrates one example system, according to an example embodiment of the present invention. The example may include one or more server computer systems, e.g., development system 310. This may be one server, a set of local servers, or a set of geographically diverse servers. Each server may include an electronic computer processor 302, one or more sets of memory 303, including database repositories 305, and various input and output devices 304. These too may be local or distributed to several computers and/or locations. Database 305 may include data comprising the various software components of the other example embodiments of the present invention. For example, the database may include one or more interfaces 323. The database may include test components 322. The interface may include an object identifier 321, which may include the object freezer 327. Together or separately, the database may also include the MBAs 320 along with the adaptation components 326. These entities may be stored in database 305, or may be distributed across other systems, independently or connected via a communication network.

Any suitable technology may be used to implement embodiments of the present invention, such as general purpose computers. One or more system servers may operate hardware and/or software modules to facilitate the inventive processes and procedures of the present application, and constitute one or more example embodiments of the present invention. Further, one or more servers may include a computer readable storage medium, e.g., memory 303, with instructions to cause a processor, e.g., processor 302, to execute a set of steps according to one or more example embodiments of the present invention.

Further, example embodiments of the present invention are directed to one or more processors, which may be implemented using any conventional processing circuit and device or combination thereof, e.g., a Central Processing Unit (CPU) of a Personal Computer (PC) or other workstation processor, to execute code provided, e.g., on a hardware computer-readable medium including any conventional memory device, to perform any of the methods described herein, alone or in combination. The one or more processors may be embodied in a server or user terminal or combination thereof. The user terminal may be embodied, for example, a desktop, laptop, hand-held device, Personal Digital Assistant (PDA), television set-top Internet appliance, mobile telephone, smart phone, etc., or as a combination of one or more thereof. The memory device may include any conventional permanent and/or temporary memory circuits or combination thereof, a non-exhaustive list of which includes Random Access Memory (RAM), Read Only Memory (ROM), Compact Disks (CD), Digital Versatile Disk (DVD), and magnetic tape.

It will be appreciated that all of the disclosed methods and procedures described herein can be implemented using one or more computer programs or components. These components may be provided as a series of computer instructions on any conventional computer-readable medium, including RAM, ROM, flash memory, magnetic or optical disks, optical memory, or other storage media. The instructions may be configured to be executed by a processor which, when executing the series of computer instructions, performs or facilitates the performance of all or part of the disclosed methods and procedures.

It should be understood that there exist implementations of other variations and modifications of the invention and its various aspects, as may be readily apparent to those of ordinary skill in the art, and that the invention is not limited by specific embodiments described herein. Features and embodiments described above may be combined. It is therefore contemplated to cover any and all modifications, variations, combinations or equivalents that fall within the scope of the basic underlying principals disclosed and claimed herein.

The invention claimed is:

1. A system for providing stable add-on applications to a released software environment, comprising:
   an electronic storage medium configured to store an add-on application;
   an electronic processor in communication with the electronic storage medium;
   wherein the released software environment includes released objects designed for access by outside programs and internal objects designed for use by only the released software environment and an adaptation component;
   wherein the add-on application includes the adaptation component and an application component, both configured to execute on the electronic processor;
   wherein the application component is configured to call only released objects and the adaptation component is configured to call internal objects;
   wherein the released software environment includes an interface that includes all objects accessed by the add-on application;
     wherein the interface includes an object freeze function that operates on all the objects accessed by the add-on application;
     wherein the interface includes an automatic test function to detect changes in behavior of the objects accessed by the add-on application; and
   wherein the electronic processor is configured to, freeze all objects in the interface, so that no changes can be made without sending a change indication; invoke the automatic test function to detect changes to the interface; responsive to the indication by the automatic test function, compile a new interface version and a new adaptation component version; refreeze any newly changed components of the interface within the new interface version or new adoption component version; and update the automatic test function to a new version for detecting future changes;
   wherein the indication from the automatic test function is transmitted to the developer upon detection of a change in one or more of the objects accessed by the add-on application.

2. The system of claim 1, wherein the adaptation component is configured perform all error handing for calls made to internal objects.

3. The system of claim 1, wherein the adaptation component is configured perform all conflict resolutions for calls made to internal objects.

4. The system of claim 1, wherein freezing an object ensures a warning message is sent to a developer assigned to the object, responsive to a change or attempted change in the object.

5. The system of claim 1, wherein freezing an object ensures an instruction set is sent to a developer assigned to the object, responsive to a change or attempted change in the object by the developer.

6. A method for providing stable add-on applications to a released software environment, comprising:
   providing the released software environment that includes released objects designed for access by outside programs and internal objects designed for use by only the released software environment and an adaptation component;
   providing an add-on application that includes the adaptation component and an application component;
   restricting the application component to call only released objects;
   allowing the adaptation component to call internal objects;
   providing an interface for the released software environment that includes all objects accessed by the add-on application wherein the interface includes an object freeze function that operates on all the objects accessed by the add-on application and an automatic test function to detect changes in behavior of the objects accessed by the add-on application;
   freezing the interface with an object freeze function and thereby freezing all objects in the interface so that no changes can be made without sending a change indication;
   automatically testing the interface, by the automatic test function, to detect changes in behavior of the objects accessed by the add-on application and send the indication upon the detection;
   responsive to the indication by the automatic test function, compiling a new interface version, component version;
   refreezing any newly changed components of the interface within the new interface version or new adaption component version; and
   updating the automatic test function to a new version for detecting future changes;
   wherein the indication from the automatic test function is transmitted to the developer upon detection of a change in one or more of the objects accessed by the add-on application.

7. The method of claim 6, further comprising:
performing, in the adaptation component, all error handing for calls made to internal objects.

8. The method of claim 6, further comprising:
performing, in the adaptation component, all conflict resolutions for calls made to internal objects.

9. The method of claim 6, further comprising:
as part of freezing an object and responsive to a change or attempted change in the object: sending a warning message to a developer assigned to the object.

10. The method of claim 6, further comprising:
as part of freezing an object and responsive to a change or attempted change in the object: sending an instruction set to a developer assigned to the object.

11. A memory device storing instructions configured to be executed by a processor, the instructions which, when executed by the processor, cause the performance of a method, comprising:
providing the released software environment that includes released objects designed for access by outside programs and internal objects designed for use by only the released software environment and an adaptation component;
providing an add-on application that includes the adaptation component and an application component;
restricting the application component to call only released objects;
allowing the adaptation component to call internal objects;
providing an interface for the released software environment that includes all objects accessed by the add-on application wherein the interface includes an object freeze function that operates on all the objects accessed by the add-on application and an automatic test function to detect changes in behavior of the objects accessed by the add-on application;
freezing the interface with an object freeze function and thereby freezing all objects in the interface so that no changes can be made without sending a change indication;
automatically testing the interface, by the automatic test function, to detect changes in behavior of the objects accessed by the add-on application and send the indication upon the detection;
responsive to the indication by the automatic test function, compiling a new interface version, and a new adaptation component version;
refreezing any newly changed components of the interface within the new interface version or new adaption component version; and
updating the automatic test function to a new version for detecting future changes;
wherein the indication from the automatic test function is transmitted to the developer upon detection of a change in one or more of the objects accessed by the add-on application.

12. The memory device of claim 11, further comprising: performing, in the adaptation component, all error handing for calls made to internal objects.

13. The memory device of claim 11, further comprising: performing, in the adaptation component, all conflict resolutions for calls made to internal objects.

14. The memory device of claim 11, further comprising: as part of freezing an object and responsive to a change or attempted change in the object: sending a warning message to a developer assigned to the object.

15. The memory device of claim 11, further comprising: as part of freezing an object and responsive to a change or attempted change in the object: sending an instruction set to a developer assigned to the object.

* * * * *